US005340527A

United States Patent [19]

Gibson et al.

[11] Patent Number: 5,340,527

[45] Date of Patent: Aug. 23, 1994

[54] SHAPING PANELS OF MICROPOROUS THERMAL INSULATION

[75] Inventors: Barry Gibson, Birkenhead; James A. McLoughlin, Wirral, both of United Kingdom

[73] Assignee: Micropore International Limited, Great Britain

[21] Appl. No.: 992,710

[22] Filed: Dec. 18, 1992

[30] Foreign Application Priority Data

Dec. 20, 1991 [GB] United Kingdom .............. 9127068.6

[51] Int. Cl.[5] .............................................. B29C 53/18

[52] U.S. Cl. .................................. 264/320; 264/296

[58] Field of Search ................................ 264/320, 296

[56] References Cited

U.S. PATENT DOCUMENTS

| | | | |
|---|---|---|---|
| 1,597,623 | 8/1926 | Schumaker . | |
| 1,639,128 | 8/1927 | Clark . | |
| 2,035,495 | 3/1936 | Mills | 154/1 |
| 2,213,442 | 9/1940 | Elliott | 154/1 |
| 3,019,478 | 2/1962 | Erickson et al. | 264/296 |
| 3,367,818 | 2/1968 | Voelker | 156/216 |

FOREIGN PATENT DOCUMENTS

| | | |
|---|---|---|
| 0061633 | 10/1982 | European Pat. Off. . |
| 0161982 | 11/1985 | European Pat. Off. . |
| 2462655 | 12/1979 | Fed. Rep. of Germany . |
| 3019528 | 11/1981 | Fed. Rep. of Germany . |
| 57-176131 | 1/1983 | Japan . |
| 1518795 | 7/1978 | United Kingdom . |

*Primary Examiner*—James Derrington
*Attorney, Agent, or Firm*—Ira S. Dorman

[57] ABSTRACT

At least one edge of a substantially planar panel of microporous thermal insulation material is shaped by first restraining the planar faces of the panel so as to resist deformation of the faces of the panel adjacent to the edge of the panel to be shaped. A forming member is then urged against the edge of the panel so as to shape the edge, the forming member being profiled such as to cause the edge of the panel to be recessed. The forming member is then removed from the edge of the panel so as to permit the panel to adopt a relatively square edge, and the planar faces of the panel are released.

9 Claims, 2 Drawing Sheets

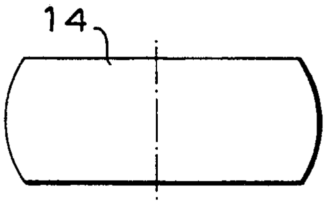
FIG 4a
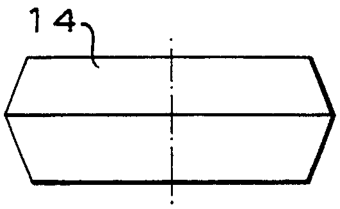
FIG 4b
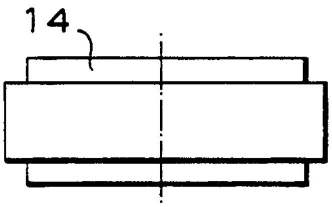
FIG 4c
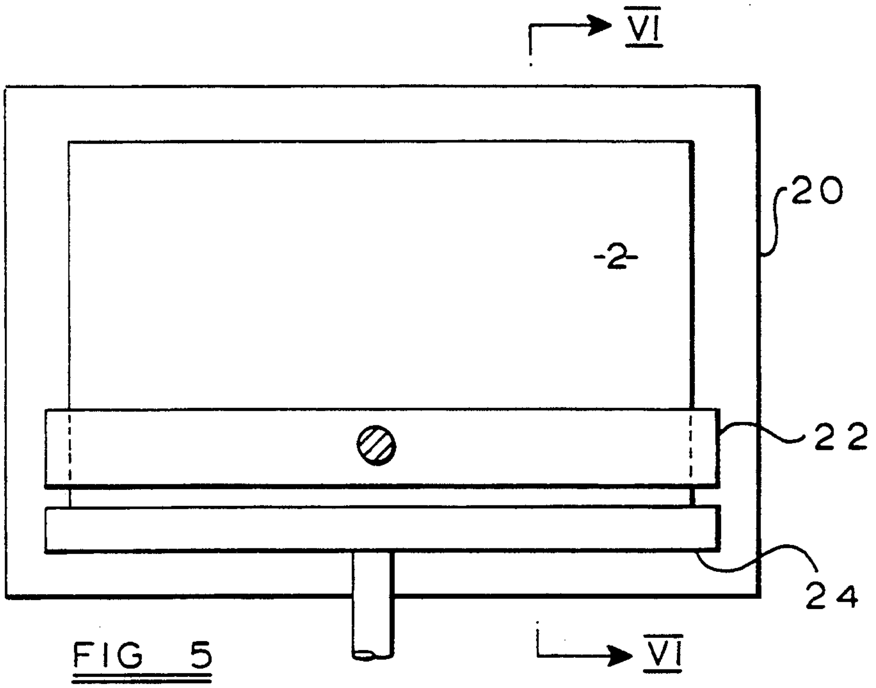
FIG 5
FIG 6
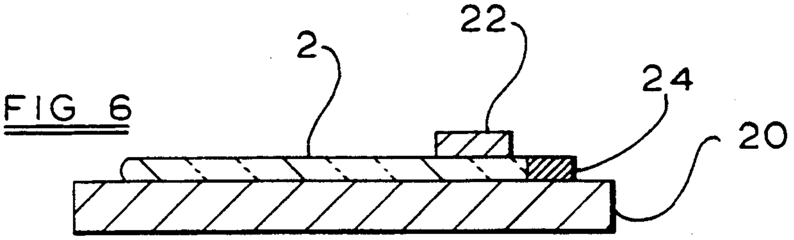
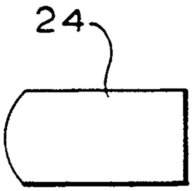
FIG 7a
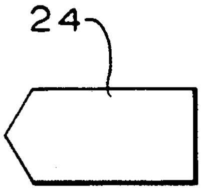
FIG 7b
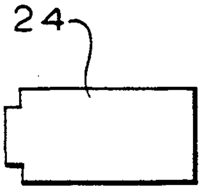
FIG 7c

SHAPING PANELS OF MICROPOROUS THERMAL INSULATION

The present invention relates to a method of shaping at least one edge of a panel of microporous thermal insulation which comprises a porous envelope containing a block of compacted dry particulate microporous thermal insulation material.

BACKGROUND TO THE INVENTION

It is known, for example from GB-A-1 350 661, to provide a thermal insulating panel comprising an outer porous envelope, for example of glass-fibre cloth, containing a block of consolidated dry particulate insulating material such as a microporous thermal insulation material. The insulation material is introduced into a porous envelope and pressure is applied to the exterior of the envelope to consolidate the insulation material into block form and to create a tension strain in the material of the envelope and thereby bonding the envelope to the surface of the block by penetration of particles of insulating material at the surface of the block into the pores of the envelope.

This known method of manufacturing panels of microporous thermal insulation material produces handleable panels having excellent thermal insulating properties. Such panels are widely used, for example in electric thermal storage heaters. The disadvantages of the panels, however, is that the edges of the panels are rounded. This rounded profile results from the manner in which the envelope is compressed in a platen press and makes it difficult to butt such a panel against a flat surface or, more particularly, against another similar panel of microporous thermal insulation material without the risk of poor thermal insulation performance in the region of the joint. There is thus a considerable demand for a microporous thermal insulating panel having relatively square, rather than rounded, edges.

OBJECTS OF THE INVENTION

It is therefore an object of the present invention to provide a method of shaping at least one edge of a panel of microporous thermal insulating material such that the edge or edges of the panel more readily butt against flat surfaces or against the edges of other similar panels.

SUMMARY OF THE INVENTION

According to the present invention there is provided a method of shaping at least one edge of a substantially planar panel of microporous thermal insulation material comprising a porous envelope containing a block of dry particulate microporous thermal insulation material, which method comprises the steps of:

- applying restraining means to the substantially planar faces of the panel for resisting deformation of the faces of the panel at least in a region thereof adjacent to at least a portion of the at least one edge of the panel to be shaped;
- urging a forming member against the at least one edge of the panel so as to shape the edge thereof, the forming member being profiled such as to cause the edge of the panel to be recessed; and
- removing the forming member from the edge of the panel so as to permit the panel to adopt a relatively square edge, and removing the restraining means from the faces of the panel.

The restraining means may comprise a support having a bar spaced therefrom, the support and the bar co-operating with the panel as the panel is moved therebetween so as to resist deformation of the faces of the panel in a region thereof adjacent to a portion of the at least one edge of the panel to be shaped. The forming member may comprise a wheel positioned between the support and the bar, the wheel being urged against the edge of the panel so as to shape the edge as the panel is moved past the wheel. The forming member may include two wheels positioned so as to be urged against opposite sides of the panel as the panel is moved past the wheels.

Alternatively, the restraining means may comprise a support having a pressure bar, the pressure bar being movable towards the support so as to compress at least a part of the panel between the bar and the support during the urging of the forming member against the at least one edge of the panel. The forming member may comprise at least one forming bar movable in a direction substantially parallel to the faces of the panel, the forming bar being movable towards and away from an edge of the panel so as to shape the edge.

The forming member may be provided with a part-circular profile, an angular profile, or a stepped profile.

For a better understanding of the present invention and to show more clearly how it may be carried into effect reference will now be made, by way of example, to the accompanying drawings in which:

BRIEF DESCRIPTION OF THE DRAWINGS

FIGS. 4*a*, 4*b* and 4*c* are alternative embodiments of profiled rollers for use in the method of FIGS. 2 and 3;

FIG. 5 is a plan view illustrating a method of re-shaping one edge of a panel comprising a block of microporous thermal insulation material compacted within a porous envelope;

FIG. 6 is a sectional view taken along the line VI—VI in FIG. 5; and

FIGS. 7*a*, 7*b* and 7*c* are alternative embodiments of profiled bars for use in the method of FIGS. 5 and 6.

DESCRIPTION OF PREFERRED EMBODIMENTS

Figure 1:
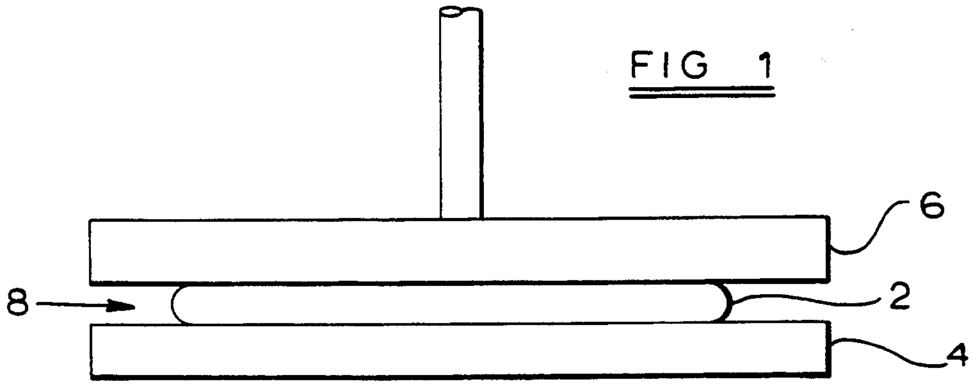
FIG. 1 is an elevational illustration of one method of forming a panel comprising a block of microporous thermal insulation material compacted within a porous envelope.

FIG. 1 illustrates a known method of manufacturing a panel of microporous thermal insulation material.

The term 'microporous' is used herein to identify porous or cellular materials in which the ultimate size of the cells or voids is less than the mean free path of an air molecule at NTP, i.e. of the order of 100 nm or smaller. A material which is microporous in this sense will exhibit very low transfer of heat by air conduction (that is collisions between air molecules). Such microporous materials include aerogel, which is a gel in which the liquid phase has been replaced by a gaseous phase in such a way as to avoid the shrinkage which would occur if the gel were dried directly from a liquid. A substantially identical structure can be obtained by controlled precipitation from solution, the temperature and pH being controlled during precipitation to obtain an open lattice precipitate. Other equivalent open lattice structures include pyrogenic (fumed) and electro-thermal types in which the average ultimate particle size is less than 100 nm. Any of these materials, based for example on silica, alumina or other metal oxides, may be used to prepare a composition which is microporous as defined above.

The thermal insulating material comprises a microporous material in the form of a mixture of highly-dispersed pyrogenic silica, alumino-silicate ceramic fibre reinforcement and rutile powder opacifier, mixed together in known manner. The mixture is made by mixing the constituents of the insulating material in the following proportions by weight:

| | |
|---|---|
| Pyrogenic silica | 62% |
| Ceramic fibre | 5% |
| Rutile powder | 33% |

A predetermined amount of the microporous thermal insulation mixture is introduced through an opening in a porous bag 2, for example of glass-fibre fabric. The bag 2 is then closed and placed between the platens 4, 6 of a press. The bag is then compressed so as to compact the mixture and the bag 2 into a semi-rigid panel in which the fabric of the envelope is maintained under strain and the compacted insulation material is bonded to the envelope as a result of penetration of particles of the insulation material into the pores of the envelope.

When the panel is removed from the press it is found to be a flat, handleable product, but as can be seen from FIG. 1 the edges 8 of the panel are rounded rather than square. This is a natural consequence of compressing a dry particulate material within a flexible envelope.

Figure 2:
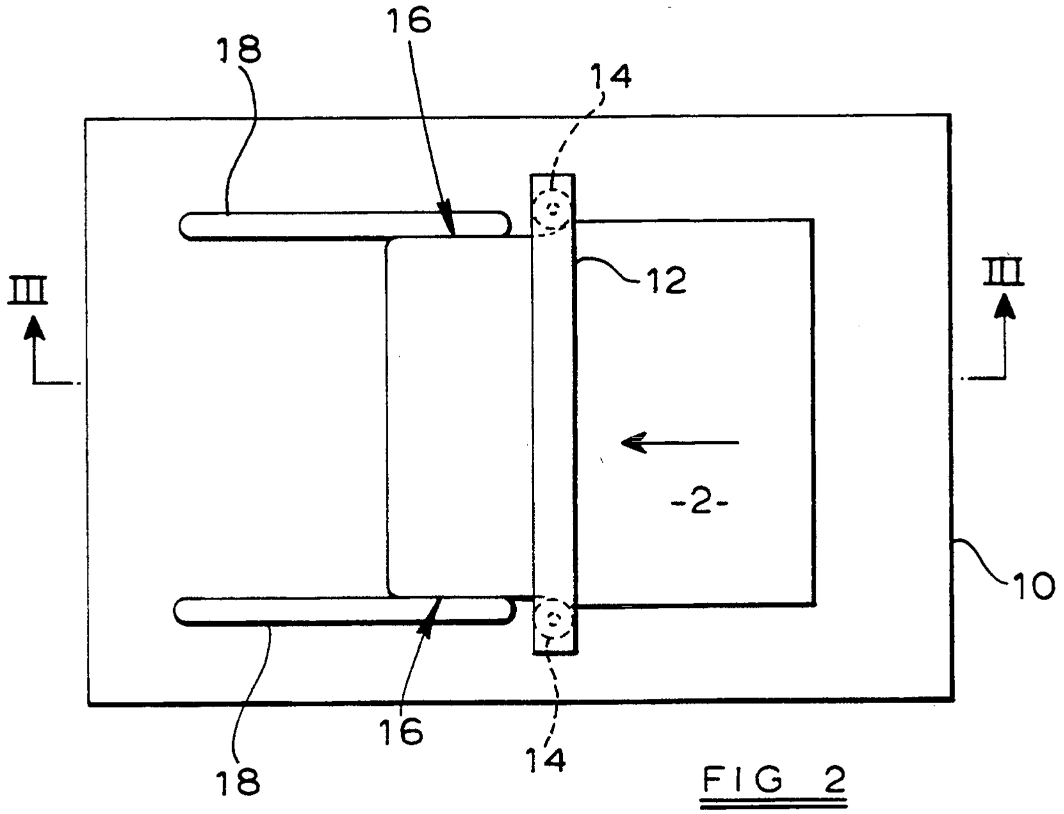
FIG. 2 is a plan view illustrating one method of reshaping two opposing edges of a panel comprising a block of microporous thermal insulation material compacted within a porous envelope.
Figure 3:
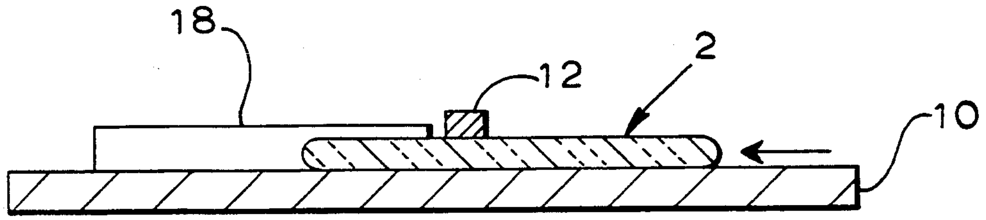
FIG. 3 is a sectional elevational view taken along the line III—III in FIG. 2.

FIGS. 2, 3 and 4 illustrate one method in which two opposing rounded edges 8 of the panel 2 can be made relatively square. FIGS. 2 and 3 show a support 10 for the panel 2, the support carrying a pressure member 12 positioned to bear gently upon the upper surface of the panel 2. Arranged between the support 10 and the pressure member 12, in the region where the pressure member bears on the upper surface of the panel 2, are two rollers 14 which are spaced apart by a predetermined distance such as to convert the rounded edges 8 of the panel into relatively square edges 16. Positioned downstream of the rollers 14 are two elongate guide members 18 which assist in maintaining the panel 2 in the desired orientation.

In previous attempts to form relatively square edges on the panels 2, we have found it is not possible subsequently to re-shape the rounded edges 8. Such action merely breaks up the microporous thermal insulation material in the region of the edges and damages the panel. Surprisingly, we have found that, by applying even a gentle pressure to the planar surfaces of the panel, a panel having rounded edges can be pushed in the direction shown by the arrow through the apparatus illustrated in FIGS. 2 and 3 and the edges can be made more square by the action of the rollers 14 as the panel 2 passes beneath the pressure member 12.

However, we have found that the use of simple cylindrical rollers does not give rise to an acceptably square edge. We have found this is because the microporous insulation material expands after the compressing force of the rollers is removed and returns partly to its previous rounded configuration. We have been able to overcome this potential problem, however, by giving the rollers 14 a profile such as one of those illustrated in FIGS. 4*a*, 4*b* and 4*c*. Thus the rollers 14 have a greater diameter in the region of the centre of the thickness of the panel 2 than in the regions of the planar surfaces thereof and initially cause the edges of the panel to be recessed. However, once a portion of the panel has passed the rollers the thermal insulation material expands and adopts a relatively square edge. FIG. 4*a* shows that the rollers 14 can have a curved surface, FIG. 4*b* shows that the rollers 14 can be made in the form of two frustoconical sections, and FIG. 4*c* shows that an intermediate portion of the rollers 14 can have a greater diameter than the end portions of the rollers. We have found that such profiled rollers 14 can, in a relatively simple and straightforward manner in combination with the pressure member 12, enable panels 2 to be formed with relatively square edges 16 without the microporous thermal insulation material in the edge region of the panel breaking up and damaging the panel.

The other two edges of the panel can also be made relatively square simply by re-orientating the panel and pushing the two remaining rounded edges of the panel 2 past the rollers 14.

FIGS. 5, 6 and 7 illustrate a method in which one rounded edge 8 of the panel 2 can be made relatively square. FIGS. 5 and 6 show a support 20 for the panel 2. A pressure member 22 is arranged above the support 20 and is movable towards and away from the support, by means such as an hydraulic ram (not shown), so as to be able to bear upon a region of the upper surface of the panel 2 adjacent to an edge of the panel that is to be made relatively square.

Movable laterally by means (not shown) towards and away from the panel 2 is a forming member 24 for forming the edge of the panel, in the region of the panel constrained by the pressure member 22, from a rounded section into a relatively square section.

As with the rollers 14, we have found that the use of simple straight-edged forming member 22 does not give rise to an acceptably square edge. However, we have again been able to overcome this potential problem by giving the forming member 24 a profile such as one of those illustrated in FIGS. 7*a*, 7*b* and 7*c*. The forming member 24 compacts the thermal insulation to a greater extent in the central region of the thickness of the panel such that the edge is recessed when the forming member reaches the end of its stroke. However, as the forming member is retracted, the thermal insulation material expands which results in a relatively square edge being formed on the panel. The forming member shown in FIG. 7*a* has a part-circular profile, the forming member shown in FIG. 7b has an angular profile, while the forming member shown in FIG. 7*c* has a stepped profile. As with the embodiment of the invention described with reference to FIGS. 2, 3 and 4, we have found that the profiled forming member 24 can, in a relatively simple and straightforward manner in combination with the pressure member 22, enable panels 2 to be formed with relatively square edges without the microporous thermal insulation material in the edge region of the panel breaking up and damaging the panel.

The remaining edges of the panel can be made square either by re-orientating the panel and repeating the method and/or by providing additional forming members in combination with a suitably shaped pressure member 22 which is adapted to apply compressive pressure in the required regions of the panel.

We claim:

1. A method of shaping at least one rounded edge of a substantially planar panel of microporous thermal insulation material comprising a porous envelope containing a block of dry particulate microporous thermal insulation material, which method comprises the steps of:

applying restraining means to the substantially planar faces of the panel for resisting deformation of the faces of the panel at least in a region thereof adjacent to at least a portion of the at least one edge of the panel to be shaped;

urging a forming member against the at least one rounded edge of the panel so as to shape the edge thereof, the forming member being profiled such as to cause the edge of the panel to be recessed; and removing the forming member from the edge of the panel so as to permit the panel to adopt a relatively square edge, and removing the restraining means from the faces of the panel.

2. A method according to claim 1, wherein the restraining means comprises a support having a bar spaced therefrom, the support and the bar co-operating with the panel as the panel is moved therebetween so as to resist deformation of the faces of the panel in a region thereof adjacent to a portion of the at least one edge of the panel to be shaped.

3. A method according to claim 2, wherein the forming member comprises a wheel positioned between the support and the bar, the wheel being urged against the edge of the panel so as to shape the edge as the panel is moved past the wheel.

4. A method according to claim 3 and including two wheels positioned so as to be urged against opposite sides of the panel as the panel is moved past the wheels.

5. A method according to claim 1, wherein the restraining means comprises a support having a pressure bar, the pressure bar being movable towards the support so as to compress at least a part of the panel between the bar and the support during the urging of the forming member against the at least one edge of the panel.

6. A method according to claim 5, wherein the forming member comprises at least one forming bar movable in a direction substantially parallel to the faces of the panel, the forming bar being movable towards and away from an edge of the panel so as to shape the edge.

7. A method according to claim 1, wherein the forming member is provided with a part-circular profile.

8. A method according to claim 1, wherein the forming member is provided with an angular profile.

9. A method according to claim 1, wherein the forming member is provided with a stepped profile.

* * * * *